United States Patent
Nonoyama et al.

[19]

[11] Patent Number: 6,135,201
[45] Date of Patent: Oct. 24, 2000

[54] AIR CONDITIONING APPARATUS FOR VEHICLE WITH DOUBLE LAYER FLOW MODE

[75] Inventors: Hiroshi Nonoyama, Toyota; Takayoshi Kawai, Hoi-gun; Toshihiko Muraki; Tetsuya Takechi, both of Kariya; Junji Yokoi, Toyota; Makoto Mimoto, Chita-gun, all of Japan

[73] Assignee: DENSO Corporation, Kairya, Japan

[21] Appl. No.: 09/166,999

[22] Filed: Oct. 6, 1998

[30] Foreign Application Priority Data

Oct. 7, 1997 [JP] Japan ................................. 9-274679

[51] Int. Cl.[7] .............................. B60H 1/00; F25B 29/00
[52] U.S. Cl. .......................... 165/202; 165/42; 165/43; 165/244; 165/204; 165/249; 454/75; 236/49.3; 237/2 A; 237/12.3 A; 237/12.3 B
[58] Field of Search ................................. 165/42, 43, 202, 165/244, 204, 249; 454/75; 237/12.3 A, 12.3 B, 2 A; 236/49.3

[56] References Cited

U.S. PATENT DOCUMENTS

| | | | |
|---|---|---|---|
| 4,523,715 | 6/1985 | Ohsawa et al. ............................. | 165/43 |
| 4,685,508 | 8/1987 | Iida ........................................... | 165/43 |
| 4,779,672 | 10/1988 | Seikou et al. .............................. | 165/43 |
| 4,802,405 | 2/1989 | Ichitami et al. ........................... | 165/42 |
| 5,074,463 | 12/1991 | Suzuki et al. .............................. | 165/42 |
| 5,590,540 | 1/1997 | Ikeda et al. ................................ | 454/75 |
| 5,653,386 | 8/1997 | Hennessee ................................. | 454/75 |
| 5,699,960 | 12/1997 | Kato et al. ......................... | 237/12.3 A |
| 5,857,905 | 1/1999 | Uemura et al. ............................ | 165/43 |

FOREIGN PATENT DOCUMENTS

| | | | |
|---|---|---|---|
| 3710470 | 10/1987 | Germany .......................... | 237/12.3 A |
| 3801636 | 7/1989 | Germany ................................. | 454/75 |
| 0047312 | 4/1981 | Japan ..................................... | 165/43 |
| 0082624 | 7/1981 | Japan ..................................... | 454/75 |
| 0143213 | 6/1986 | Japan ............................... | 237/12.3 A |
| 124426 | 5/1993 | Japan . | |

*Primary Examiner*—John K. Ford
*Attorney, Agent, or Firm*—Harness, Dickey & Pierce, PLC

[57] ABSTRACT

In an air conditioning apparatus for a vehicle, a double layer flow mode is set when the maximum heating state is set during an air outlet mode where both a foot opening portion and a defroster opening portion are opened. During the double layer flow mode, an air passage of an air conditioning case is partitioned into a first air passage through which inside air flows and a second air passage through which outside air flows, in such a manner that the first air passage communicates with the foot opening portion and the second air passage communicates with the defroster opening portion. When the double layer flow mode is set, the maximum rotation speed of a blower for blowing air is reduced by a predetermined level as compared with an entire outside air mode or an entire inside air mode. Thus, heating capacity for a passenger compartment of the vehicle can be improved.

3 Claims, 8 Drawing Sheets

AIR CONDITIONING APPARATUS FOR VEHICLE WITH DOUBLE LAYER FLOW MODE

CROSS-REFERENCE TO RELATED APPLICATION

This application is related to and claims priority from Japanese Patent Application No. Hei. 9-274679 filed on Oct. 7, 1997, the contents of which are hereby incorporated by reference.

BACKGROUND OF THE INVENTION

1. Field of the Invention

This invention relates to an air conditioning apparatus for a vehicle, in which a passage in an air conditioning case is partitioned into a first air passage through which inside air flows and a second air passage through which outside air flows. Inside air having been heated re-circulates and is blown out from a foot air outlet, and outside air having a low-humidity is blown out from a defroster air outlet, to improve both heating capacity for a passenger compartment and defrosting performance for a windshield.

2. Description of Related Art

In a conventional air conditioning apparatus as disclosed in JP-A-5-124426, an inside air introduction port and an outside air introduction port of a blower unit is provided at one end of an air conditioning case, and a foot opening portion, a defroster opening portion and a face opening portion are respectively provided at the other end of the air conditioning case. In the air conditioning case, there is provided a partition plate for partitioning an interior of the air conditioning case into a first air passage extending from the inside air introduction port to the face opening portion and the foot opening portion and a second air passage extending from the outside air introduction port to the defroster opening portion. Further, a heating heat exchanger, a bypass passage through which air bypasses the heating heat exchanger, and an air mixing door are provided in each of the first and second air passages. Both of the air mixing doors are disposed respectively in the first and second air passages, and are connected to a single rotary shaft extending to both the first and second air passages to be integrally rotated.

When any one of a face mode, a bi-level mode and a foot mode is selected, inside air is introduced into both the first and second air passages during an entire inside air mode, or outside air is introduced into both the first and second air passages during an entire outside air mode. When a defroster mode is selected, only outside air is introduced into both the first and second air passages. Further, when a foot/defroster mode is selected, an inside/outside air double layer flow mode (hereinafter referred to as "double layer flow mode") is selected so that inside air is introduced into the first air passage and outside air is introduced into the second air passage.

Because inside air is sucked from the inside air introduction port and outside air is sucked from the outside air introduction port during the double layer flow mode, pressure loss (i.e., air-flow resistance) is reduced and a flow rate of air is increased as compared with the entire outside air mode. However, an air conditioning apparatus which can set the double layer flow mode is generally mounted in a vehicle where heat generated in an engine is too small to heat cooling water with engine sufficiently. Therefore, in this case, when the double layer flow mode is set and the flow rate of air is increased, the temperature of air blown from a heating heat exchanger which heats air using the cooling water of the engine as a heating source is decreased. Thus, heating capacity for the passenger compartment is decreased.

SUMMARY OF THE INVENTION

In view of the foregoing problems, it is an object of the present invention to provide an air conditioning apparatus for a vehicle, which improves heating capacity for a passenger compartment when a double layer flow mode is set.

According to the present invention, in an air conditioning apparatus, when a double layer flow mode is set, a first fan of a blower blows inside air into a first air passage communicating with a first opening portion for blowing air toward a lower portion of the passenger compartment, and a second fan of the blower blows outside air into a second air passage communicating with a second opening portion for blowing air toward an inner surface of a windshield. During the double layer flow mode, a rotation speed reducing unit reduces the maximum rotation speed of the blower to a predetermined level to reduce an air volume blown by the blower. Thus, an increase of the air volume blown into the passenger compartment due to a decrease of pressure loss can be restricted, during the double layer flow mode. As a result, even when the temperature of hot water flowing into a heating heat exchanger is low, it can prevent the temperature of air blown from the heating heat exchanger from being decreased. Accordingly, a stove ratio (i.e., heating capacity/air volume) of the heating heat exchanger can be increased, and heating capacity for the passenger compartment can be improved.

Preferably, when the double layer flow mode is set, the rotation speed reducing unit reduces the maximum rotation speed of the blower to a level of an entire outside air mode where only outside air is blown into both the first and second air passages or to a level of an entire inside air mode where only inside air is blown into both the first and second air passages. Therefore, even during the double layer flow mode, a sufficient heating can be obtained in the passenger compartment.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In the embodiment of the present invention, an air conditioning apparatus is applied to a vehicle having a diesel engine or a lean burn engine, in which heat generated in the engine is too small to heat cooling water with the engine sufficiently.

Figure 1:
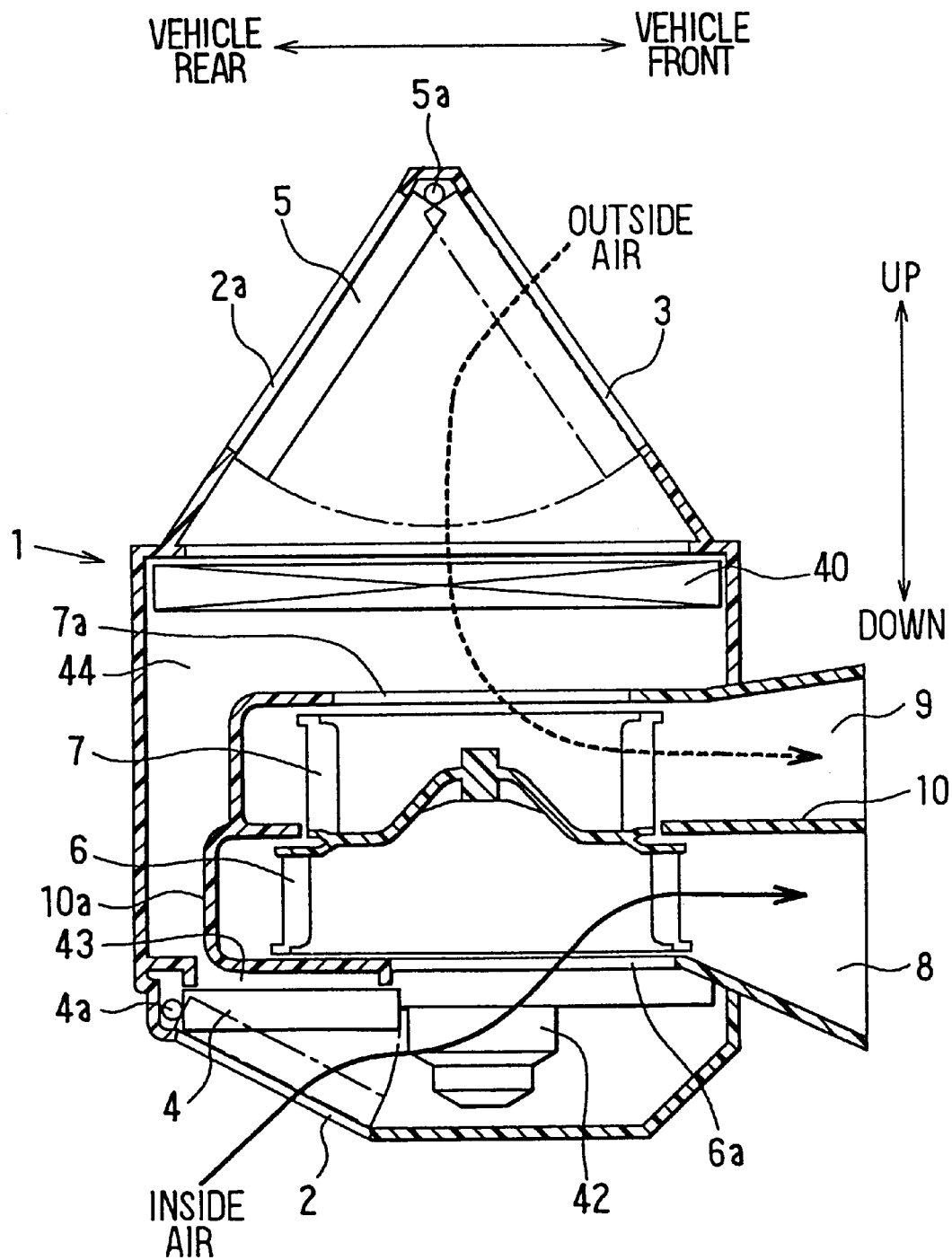
FIG. 1 is a vertical sectional view showing a blower unit of an air conditioning apparatus according to a preferred embodiment of the present invention.
Figure 2:
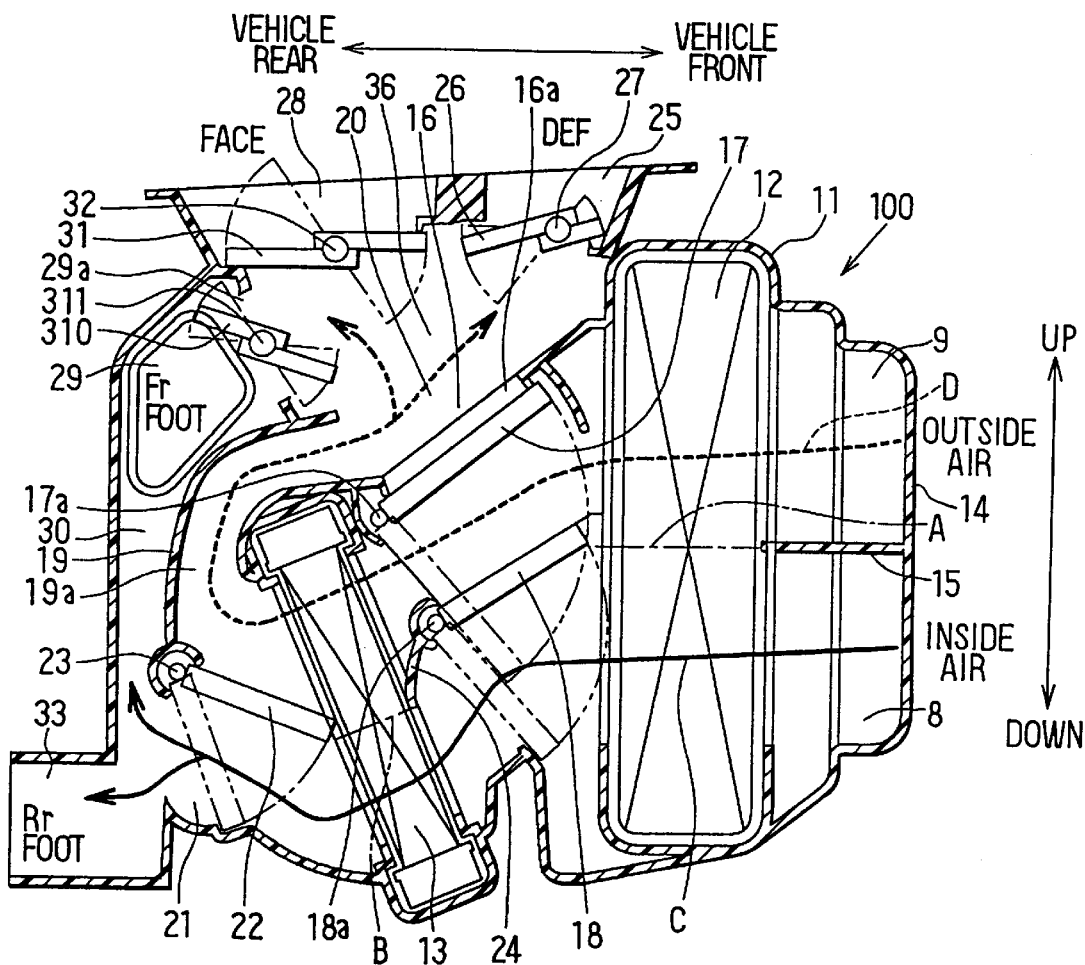
FIG. 2 is a vertical sectional view showing an air conditioning unit of the air conditioning apparatus according to the embodiment.

The air conditioning apparatus includes a blower unit 1 shown in FIG. 1, and an air conditioning unit 100 shown in FIG. 2. The air conditioning unit 100 is disposed under an instrument panel in a passenger compartment at an approximate center portion in a left-right direction of the vehicle. On the other hand, the blower unit 1 is disposed under the instrument panel at a side of the air conditioning unit 100 in the left-right direction. In the embodiment, the blower unit 1 is disposed at a front passenger's seat side next to a driver's seat. First, the blower unit 1 will be now described. The blower unit 1 is provided with first and second inside air introduction ports 2 and 2a for introducing inside air (i.e., air inside the passenger compartment) and an outside air introduction port 3 for introducing outside air (i.e., air outside the passenger compartment). The first inside air introduction port 2 is provided at a lower portion of the blower unit 1, and is opened and closed by a first inside/outside air switching door 4. The outside air introduction port 3 and the second inside air introduction port 2a are provided at an upper portion of the blower unit 1, and are opened and closed by a second inside/outside air switching door 5.

The first and second inside/outside air switching doors 4 and 5 are rotated respectively around rotary shafts 4a and 5a. The first and second inside/outside air switching doors 4 and 5 are plate-like doors, and are operatively linked and rotated by an actuator such as a servomotor through a link mechanism, based on control signals from an electronic control unit (hereinafter referred to as "ECU") of the air conditioning apparatus.

An air filter 40 for cleaning air introduced from the outside air introduction port 3 and the second inside air introduction port 2a are disposed at a lower side of the second inside/outside air switching door 5 in an up-down direction of the vehicle. A first fan (inside air side) 6 and a second fan (outside air side) 7 for blowing air introduced from the air introduction ports 2, 2a and 3 are disposed at a lower side of the air filter 40 in the up-down direction. The first and second fans 6 and 7 are centrifugal multi-blades fans (e.g., sirocco fan), and are rotated simultaneously by a single common electric motor 42. The electric motor 42 for driving the first and second fans 6, 7 is disposed at a lower side of the first fan 6. The first fan 6 has a first suction port 6a communicating with the first inside air introduction port 2. The first suction port 6a of the first fan 6 can communicate with a space 44 at a downstream side of the air filter 40, through a communication path 43. The first inside/outside air switching door 4 also opens and closes the communication path 43 while opening and closing the first inside air introduction port 2.

FIGS. 1 and 2 show a state of the double layer flow mode described later. As shown in FIGS. 1 and 2, during the double layer flow mode, because the first inside/outside air switching door 4 opens the first inside air introduction port 2 and closes the communication path 43 communicating with the outside air introduction port 3, inside air is sucked into the suction port 6a of the first fan 6. On the other hand, because the second inside/outside air switching door 5 closes the second inside air introduction port 2a and opens the outside air introduction port 3, outside air is sucked into a suction port 7a of the second fan 7. Therefore, in the double layer flow mode, the first fan 6 blows inside air from the inside air introduction port 2 into a first air passage 8, and the second fan 7 blows outside air from the outside air introduction port 3 into a second air passage 9. The first air passage 8 and the second air passage 9 are partitioned by a partition plate 10 disposed between the first fan 6 and the second fan 7. The partition plate 10 may be formed integrally with a scroll casing 10a made of resin, for accommodating both the first and second fans 6 and 7.

The air conditioning unit 100 is of a type in which both of an evaporator (i.e., cooling heat exchanger) 12 and a heater core (i.e., heating heat exchanger) 13 are integrally accommodated in an air conditioning case 11. As shown in FIG. 2, the air conditioning case 11 is made of resin which has an elasticity to some degree and is superior in a strength, such as ploypropylene, and is composed of both division cases each having a division surface in a vertical direction (i.e., up-down direction of the vehicle) in FIG. 2. The division cases are integrally connected by fastening means such as a metal spring clip and a screw, after the heat exchangers 12 and 13, and components such as a door (described later) are accommodated therein, to construct the air conditioning unit 100.

At the most front side in the air conditioning case 11, an air inlet 14 for introducing air from the blower unit 1 is provided. Therefore, air blown from the blower unit 1 flows into the air inlet 14 of the air conditioning unit 100. Because the air inlet 14 communicates with an air outlet of the blower unit 1 disposed at the front passenger's seat side next to the driver's seat, the air inlet 14 is also opened at the front passenger's seat side. At a position immediately after the air inlet 14 in the air conditioning case 11, there is disposed the evaporator 12 to cross whole areas of the first and second air passages 8 and 9. As being known well, the evaporator 12 is for cooling air while absorbing an evaporation latent heat of a refrigerant of a refrigeration cycle from air. As shown in FIG. 2, the evaporator 12 is thin in the front-rear direction of the vehicle and is disposed in the air conditioning case 11 in such a manner that a longitudinal direction thereof extends in the up-down direction of the vehicle.

An air passage extending from the air inlet 14 to the evaporator 12 is partitioned by a partition plate 15 into the first air passage 8 at a lower side of the vehicle and the second air passage 9 at an upper side of the vehicle. The partition plate 15 is formed integrally with the air conditioning case 11 by using resin, and is a stationary partition member extending approximately in a horizontal direction that is horizontal relative to the front-rear direction and the left-right direction of the vehicle. The partition plate 15 may be formed separately from the air conditioning case 11, and may be connected and fixed to the air conditioning case 11 by using fastening means such as a screw and an adhesive.

The evaporator 12 is of a laminated type in which a plurality of flat tubes, each of which is formed by connecting two metal thin plates made of aluminum or the like to each other, are laminated to sandwich a corrugated fin between adjacent flat tubes, and then integrally brazed.

At a downstream side (i.e., vehicle rear side) of the evaporator 12, there is adjacently disposed the heater core 13 to form a predetermined distance therebetween. The heater core 13 is for heating air having passed through the evaporator 12. In the heater core 13, high-temperature cooling water (hot water) for cooling an engine of the vehicle flows, and the heater core 13 heats air by using the cooling water as heat source. Similar to the evaporator 12, the heater core 13 is thin in the front-rear direction of the vehicle, and is disposed in the air conditioning case 13 so that a longitudinal direction of the heater core 13 is in the up-down direction of the vehicle. In the embodiment, the heater core 13 is slightly inclined toward a vehicle rear side by a small angle. The heater core 13 is disposed in the air conditioning case 11 to form a cool air bypass passage 16 at an upper side of the heater core 13. Through the cool air bypass passage 16, air having passed through the evaporator 12 bypasses the heater core 13.

Plate-like first and second air-mixing doors 17 and 18 for adjusting a volume of air passing through the heater core 13 and a volume of air bypassing the heater core 13 are disposed between the heater core 13 and the evaporator 12 within the air conditioning case 11. Both the first and second air-mixing doors 17, 18 are connected to rotary shafts 17a, 18a, respectively, and are rotated in the up-down direction with the rotations of the rotary shafts 17a, 18a. The rotary shafts 17a, 18a are rotatably held in the air conditioning case 11. One side ends of the rotary shafts 17a, 18a protrude to the outside of the air conditioning case 11, and are connected to an actuator such as a servomotor through a link mechanism. The first and second air-mixing doors 17, 18 are operatively linked and are rotated according to temperature control signals from the ECU 50 of the air conditioning apparatus.

The rotary shaft 17a of the first air-mixing door 17 is disposed at an upper side of the rotation shaft 18a of the second air-mixing door 18 to form a predetermined distance between both the rotary shafts 17a, 18a, so that the rotations of the first and second air-mixing doors 17, 18 are not restricted from each other. During the maximum cooling state, both the first and second air-mixing doors 17, 18 are respectively rotated to chain line positions in FIG. 2 to be overlapped, and are press-fitted to a protrusion rib of the air conditioning case 11 to close an air inlet of the heater core 13. On the other hand, during the maximum heating state, the first and second air mixing doors 17, 18 are rotated to the solid line positions in FIG. 2. Therefore, the first air-mixing door 17 closes an inlet hole 16a of the cool air bypass passage 16 and a top end of the second air-mixing door 18 is disposed at a position immediately after the evaporator 12 to be proximate to an extending line A of the partition plate 15. Therefore, during the maximum heating state, the second air-mixing door 18 is used as a movable partition member for partitioning an air passage between the evaporator 12 and the heater core 13 into the first air passage 8 and the second air passage 9.

A partition wall 19 extending in the up-down direction is formed integrally with the air conditioning case 11 at a downstream side of the heater core 13 to form a predetermined distance therebetween. By the partition wall 19, a first warm air passage 19a extending from the heater core 13 upwardly is formed in the air conditioning case 11. A downstream side (an upper side) of the first warm air passage 19a is joined with the cool air bypass passage 16 in an air-mixing chamber 20 at an upper side of the heater core 13. A warm air bypass inlet 21 is provided at a lower end (i.e., upstream end) of the partition wall 19 to be opposite to a downstream surface of the heater core 13, and is opened and closed by a warm air bypass door 22. The warm air bypass door 22 is connected to a rotary shaft 23 which is rotatably held in the air conditioning case 11 at an upper end portion of the warm air bypass inlet 21. The warm air bypass door 22 is rotated around the rotary shaft 23 between the solid line position and the chain line position in FIG. 2. In the embodiment, the warm air bypass door 22 is rotated by the actuator for driving the first and second air-mixing doors 17, 18 through a link mechanism, to be operatively linked with the both air-mixing doors 17, 18.

In the embodiment, the double layer flow mode is set during the maximum heating state. When the double layer flow mode is set during a foot mode or a foot/defroster mode, the warm air bypass door 22 is rotated to the solid line position in FIG. 2 (i.e., at a position proximate to a partition line B of the heater core 13) so that the first warm air passage 19a at a position immediately after the heater core 13 is also partitioned into the first air passage 8 and the second air passage 9. That is, the warm air bypass door 22 is used as a movable partition member for partitioning an air passage at an immediately downstream side of the heater core 13 into both air passages corresponding to the first and second air passages 8, 9. Therefore, the partition wall 19 disposed at a downstream side of the warm air bypass door 22 is also used as a stationary partition member for partitioning the first and second air passages 8, 9 from each other.

The heater core 13 is of a laminated type in which a plurality of flat tubes, each of which is formed by connecting two metal thin plates made of aluminum or the like to each other, are laminated to sandwich a corrugated fin between adjacent flat tubes, and then integrally brazed.

A stationary partition plate 24 is disposed between an upstream surface at the partition line B and the rotary shaft 17a of the second air-mixing door 18, and is formed integrally with the air conditioning case 11.

A defroster opening portion 25 is provided on an upper wall portion of the air conditioning case 11 at a vehicle front side. Conditioned air from the air-mixing chamber 20 flows into the defroster opening portion 25, and is blown toward an inner surface of a windshield of the vehicle from a defroster air outlet through a defroster duct. The defroster opening portion 25 is opened and closed by a defroster door 26 rotated around a rotary shaft 27.

On the upper wall portion of the air conditioning case 11, a face opening portion 28 is formed at a vehicle rear side of the defroster opening portion 25. Conditioned air from the air-mixing chamber 20 flows into the face opening portion 28 through the communication path 36, and is blown toward the head portion of a passenger in the passenger compartment from a face air outlet through a face duct. The face air outlet is provided on an upper portion of an instrument panel of the vehicle.

A front foot opening portion 29 is provided in a rear side wall of the air conditioning case 11, at an upper side. Conditioned air from the air-mixing chamber 20 flows into the front foot opening portion 29 through the communication path 36. When the maximum heating state is set, the warm air bypass inlet 21 is opened by the warm air bypass door 22, and air from the warm air bypass inlet 21 flows into the front foot opening portion 29 through the second warm air passage 30 while conditioned air from the air-mixing chamber 20 flows into the front foot opening portion 29. Air from the front foot opening portion 29 is blown toward the foot area of a passenger seated on a front seat in the passenger compartment from a front foot air outlet through a front foot duct.

The face opening portion 28 is opened and closed by a face door 31 rotated by a rotary shaft 32. An inlet hole 29a of the front foot opening portion 29 is opened and closed by a foot door 310 rotated by a rotary shaft 311.

A rear foot opening portion 33 is provided on the rear side wall of the air conditioning case 11, and is opened to be opposite to a position directly after the warm air bypass inlet 21. Air from the warm air bypass inlet 21 and air from the second air passage 30 flow into the rear foot opening portion 33, and is blown toward the foot area of a passenger seated on a rear seat of the passenger compartment from a rear foot air outlet through a rear foot duct.

In the embodiment, when the double layer flow mode is set during the foot mode, the warm air bypass door 22 is rotated to the solid line position in FIG. 2 so that the air passage at an immediately downstream side of the heater core 13 is partitioned into the first and second air passages 8, 9. However, the first and second air passages 8, 9 communicate with each other through the communication path 36 provided at a position proximate to an inlet of the defroster opening portion 25 and an inlet of the front foot opening portion 29.

The defroster door 26, the face door 31 and the foot door 310 are operatively linked and rotated by an actuator such as a servomotor through a link mechanism, based on control signals from the ECU 50 of the air conditioning apparatus.

Each of the plate-like doors 4, 5, 17, 18, 22, 26, 31 has a door base plate which is made of resin or metal and is integrally connected to each of the rotary shafts 4a, 5a, 17a, 18a, 23, 27, 32. An elastic seal material such as polyurethane foam are bonded on both surfaces of each door base plate so that the doors 4, 5, 17, 18, 22, 26, 31 are formed.

Figure 3:
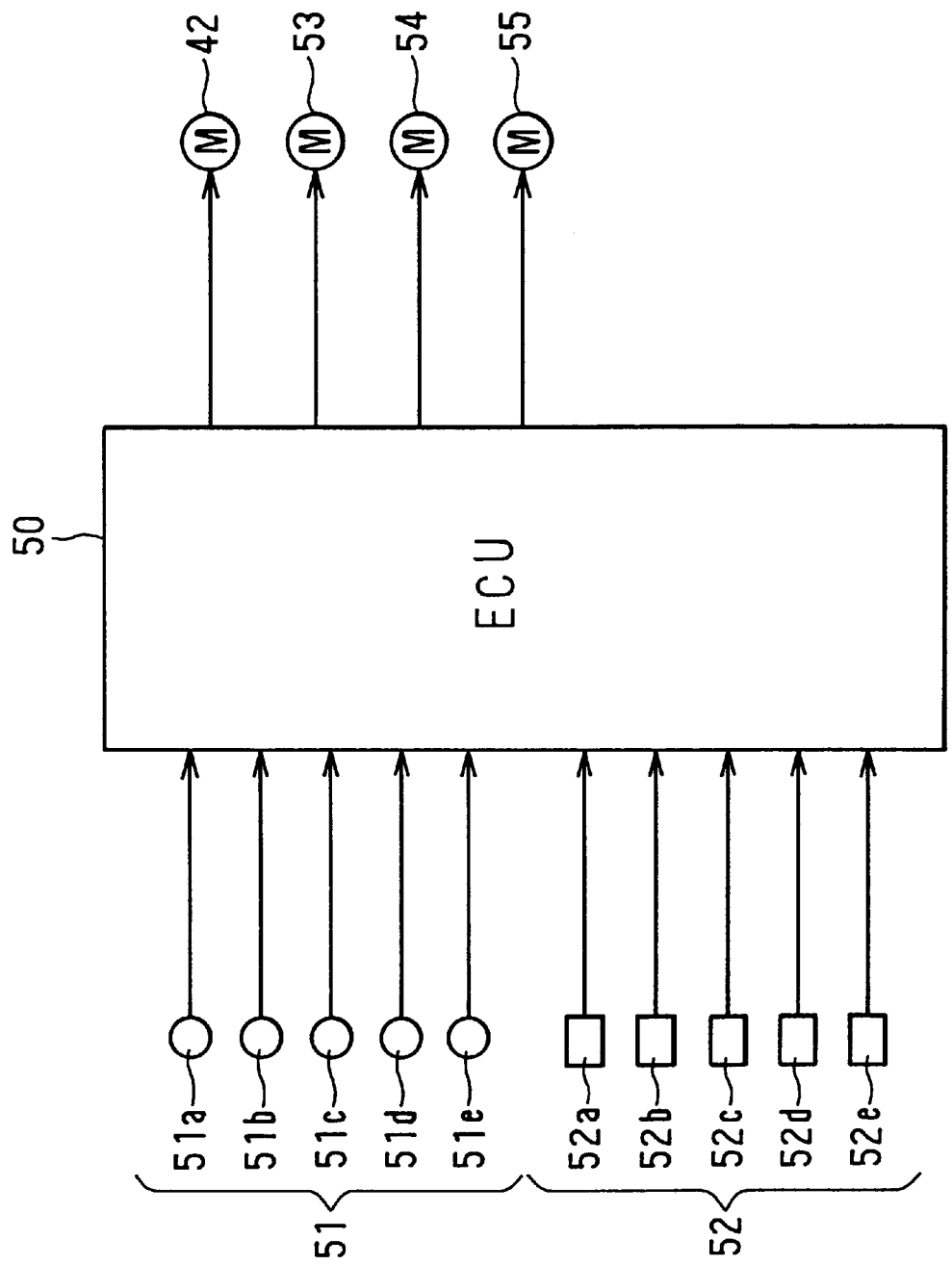
FIG. 3 is a block diagram showing an electric control of an electronic control unit (ECU) of the air conditioning apparatus according to the embodiment.

Next, the control operation of the ECU 50 constituted by a microcomputer will be now described. As shown in FIG. 3, sensor signals from a sensor group 51 including various sensors 51a–51e and operation signals from an operation group 52 including various operation units 52a–52e are input to the ECU 50. The various operation units 52a–52e are provided on an air-conditioning operation panel of the vehicle. In the ECU 50, calculation processes are performed based on a pre-set program stored in ROM according to the input signals from the sensor group 51 and the operation group 52, and control signals are output to the electric driving motor 42 and servomotors 53–55 of actuators. That is, the servomotors 53–55 include a servomotor 53 which drives the first and second inside/outside air switching doors 4, 5 through a link mechanism, a servomotor 54 which drives the first and second air-mixing doors 17, 18 and the warm air bypass door 22 operatively linked, and a servomotor 55 which drives the defroster door 26, the face door 31 and the foot door 310 operatively linked. The servomotor 54 drives the warm air bypass door 22 after rotating the first and second air-mixing doors 17, 18 to a predetermined position.

The operation group 52 includes an automatic air-conditioning control unit 52a for automatically controlling the temperature of air blown toward the passenger compartment, a temperature setting unit 52b for setting a target temperature of the passenger compartment, an air outlet mode setting unit 52c, an inside/outside air setting unit 52d, and an air volume setting unit 52e. The sensor group 51 includes an inside air temperature sensor 51a for detecting a temperature of inside air, an outside air temperature sensor 51b for detecting a temperature of outside air, a sunlight volume sensor 51c for detecting a volume of sunlight entering into the vehicle, a water temperature sensor 51d for detecting a temperature of hot water flowing into the heater core 13, and an evaporator air temperature sensor 51e for detecting a temperature of air at an air outlet of the evaporator 12.

Figure 4:
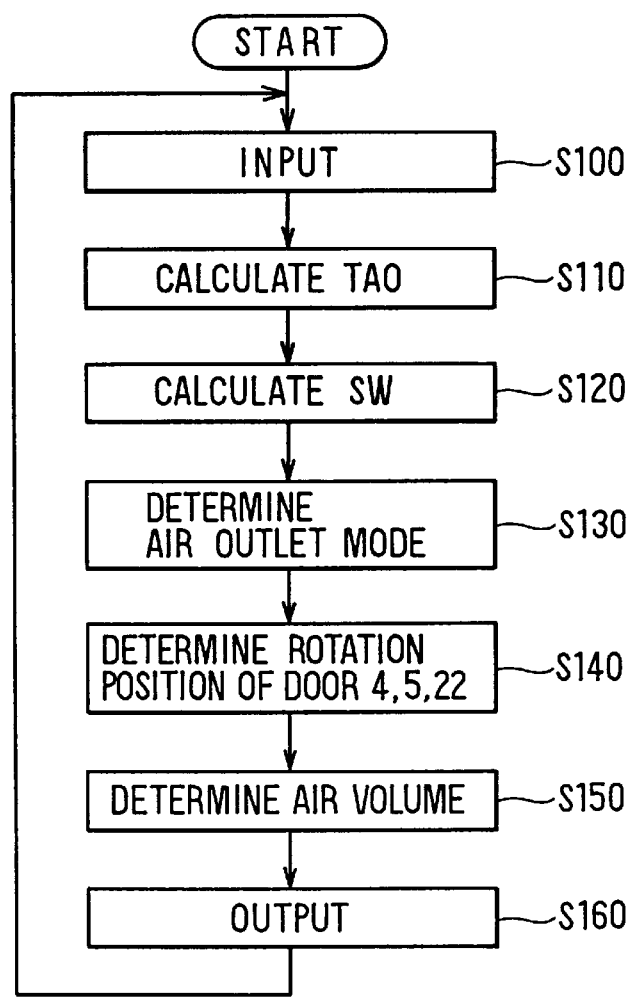
FIG. 4 is a flow chart of a control process of the electronic control unit according to the embodiment.

Next, the control processes of the ECU 50 of the air conditioning apparatus will be now described. In the embodiment, a control routine shown in FIG. 4 is performed by the ECU 50. The control routine of the ECU 50 is started, when an ignition switch of the engine and the automatic air-conditioning control unit 52a are turned on. Firstly, various sensor signals from the sensor group 51 and various operation signals from the operation group 52 are input at step S100.

At step S110, a target air temperature (TAO) of air blown into the passenger compartment is calculated based on the following formula (1).

$$TAO = Kset \times Tset - Kr \times Tr - Kam \times Tam - Ks \times Ts + C \quad (1)$$

wherein, Kset is a temperature setting gain, Tset is a temperature set by the temperature setting unit 52b, Kr is an inside air temperature gain, Tr is an inside air temperature detected by the inside air temperature sensor 51a, Kam is an outside air temperature gain, Tam is an outside air temperature detected by the outside air temperature sensor 51b, Ks is a sunlight gain, Ts is a volume of sunlight, detected by the sunlight sensor 51c, and C is a correction constant.

Next, at step S120, a target opening degree SW of the first and second air-mixing doors 17, 18 is calculated based on the following formula (2).

$$SW = [(TAO - Te)/(Tw - Te)] \times 100\% \quad (2)$$

in which, TAO is the target air temperature calculated at the step S110, Te is a temperature detected by the evaporator air temperature sensor 51e, and Tw is a cooling water temperature detected by the water temperature sensor 51d.

Figure 5:
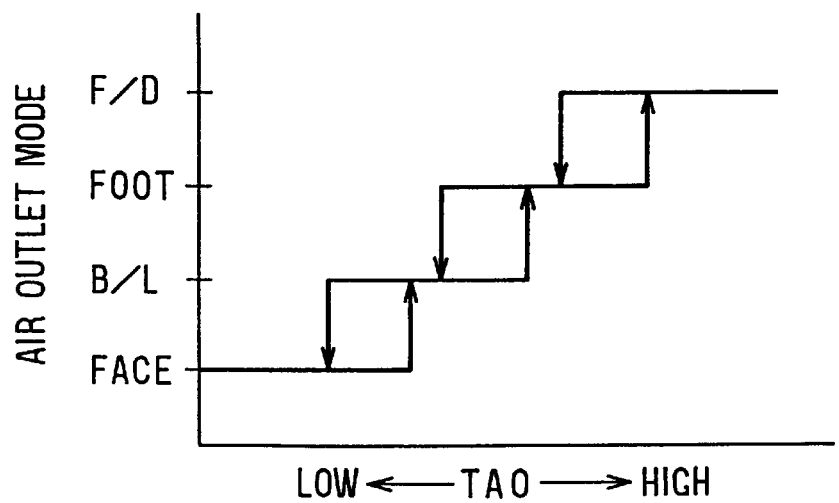
FIG. 5 is a graph showing the relationship between a target air temperature (TAO) and an air outlet mode according to the embodiment.

At step S130, an air outlet mode is determined according to the TAO, based on a map in FIG. 5 which is stored previously in the ROM. That is, as shown in FIG. 5, when the TAO is changed from a low temperature side to a high temperature side, the air outlet mode is changed from a face mode (FACE), a bi-level mode (B/L), a foot mode (FOOT) to a foot/defroster mode (F/D) in this order.

Figure 6:
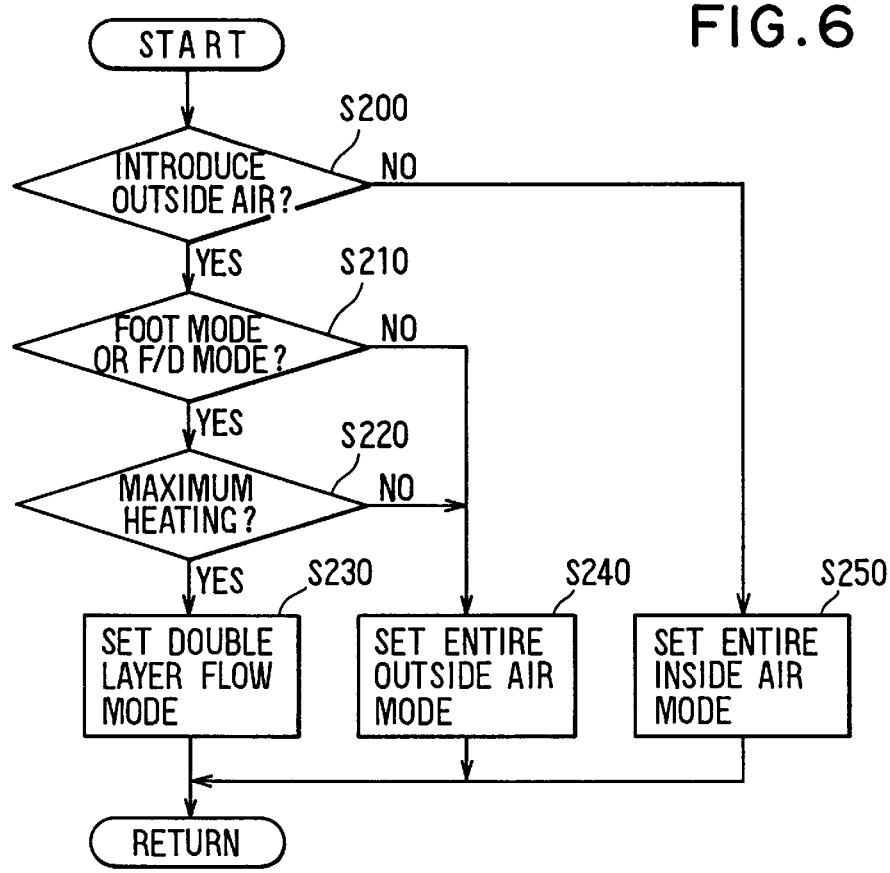
FIG. 6 is a flow chart showing a main control precess of the electric control unit according to the embodiment.

Next, at step S140, the rotation positions of the first and second inside/outside switching doors 4, 5 and the warm air bypass door 22 are determined based on the control program shown in FIG. 6. That is, as shown in FIG. 6, at step S200, it is determined whether or not the inside/outside air setting unit 52d is set at an outside air introduction position. When the inside/outside air setting unit 52d is set at the outside air introduction position, it is determined whether or not the air outlet mode is the foot mode or the foot/defroster (F/D) mode at step S210. When the air outlet mode is the foot mode or the foot/defroster mode, it is determined whether or not the air-mixing doors 17, 18 are rotated at the maximum heating positions based on the target opening degree SW at step S220. When the air-mixing doors 17, 18 are positioned at the maximum heating positions so that the maximum heating state is set, the double layer flow mode is set at step S230. That is, at step S230, the first and second inside/outside air switching doors 4, 5 are rotated at the solid line position in FIG. 1, and the warm air bypass door 22 is rotated at the solid line position in FIG. 2.

On the other hand, when the air outlet mode is not the foot mode or the foot/defroster mode at step S210, or when the maximum heating state is not set by the air-mixing doors 17, 18 at step S220, an entire outside air mode is set at step S240. That is, at step S240, the first inside/outside air switching door 4 is rotated at the chain line position in FIG. 1, the second inside/outside air switching door 5 is rotated at the solid line position in FIG. 1, and the warm air bypass door 22 is rotated at the chain line position in FIG. 2.

Further, when the inside/outside air setting unit 52d is not set at the outside air introduction position, that is, when outside air is not introduced, the inside air mode is set at step S250. That is, at step S250, the first inside/outside air switching door 4 is rotated at the solid line position in FIG. 1, the second inside/outside air switching door 5 is rotated at the chain line position in FIG. 1, and the warm air bypass door 22 is rotated at the chain line position in FIG. 2. Thus, the rotation positions of the first and second inside/outside air switching doors 4, 5 and the warm air bypass door 22 can be determined, and the sub-routine shown in FIG. 6 is finished.

Figure 7:
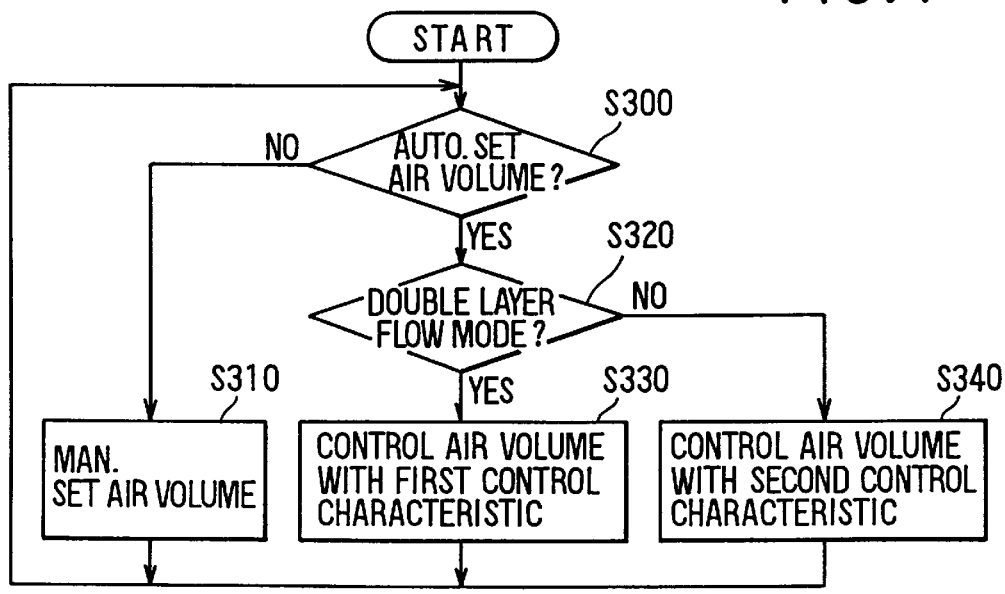
FIG. 7 is a flow chart showing an another main control process of the electric control unit according to the embodiment.

Next, at step S150 in FIG. 4, the volume of air blown by the first and second fans 6, 7 is determined. The volume of air blown by the first and second fans 6, 7 can be adjusted by controlling the voltage applied to the driving motor 42 of the first and second fans 6, 7. That is, in the embodiment, the control of the air volume blown from the first and second fans 6, 7 is performed according to a control routine shown in FIG. 7. As shown in FIG. 7, firstly, it is determined whether or not the air volume blown from the first and second fans 6, 7 is automatically set at step S300. When the air volume setting unit 52e is not operated, the air volume blown toward the passenger compartment is automatically controlled. When the air volume is automatically set, it is determined whether or not the double layer flow mode is set at step S320. When the double layer flow mode is set at step S230 in FIG. 6, the air volume is controlled according to a first control characteristic shown in FIG. 8 at step S330. Alternatively, when the double layer flow mode is not set, the air volume is controlled according to a second control characteristic shown in FIG. 9 at step S340.

Figure 8:
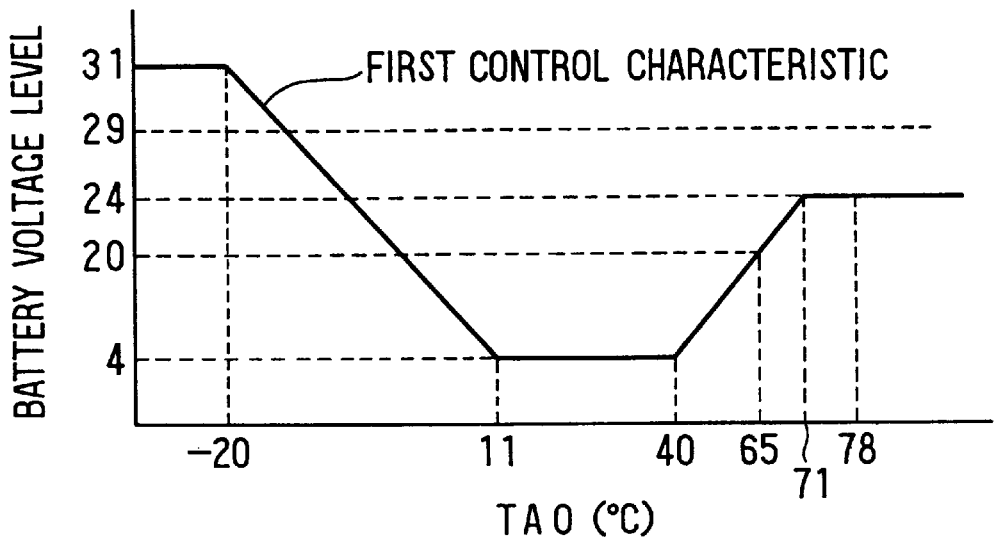
FIG. 8 is a graph of a first control characteristic of a fan, showing the relationship between a battery voltage level and the target air temperature (TAO) according to the embodiment.
Figure 9:
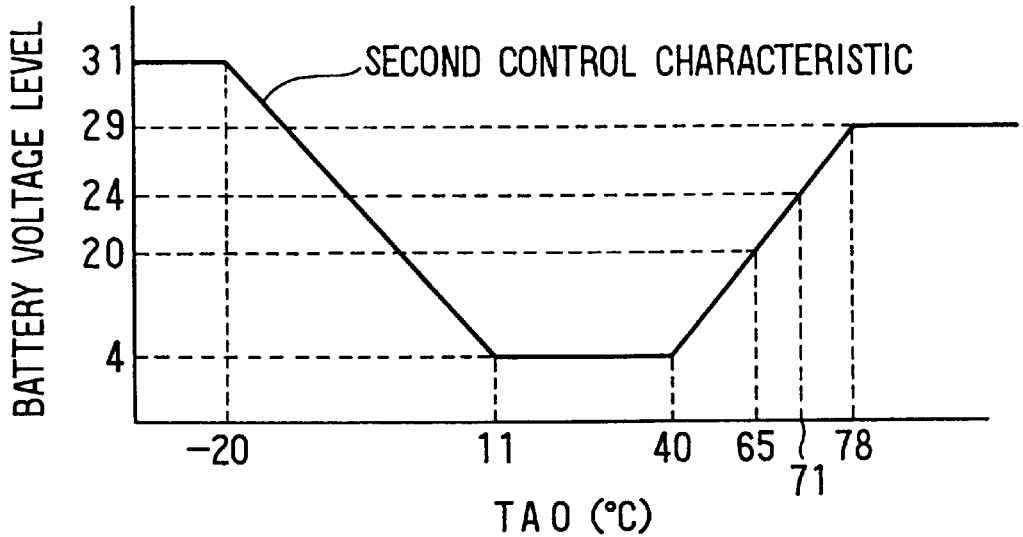
FIG. 9 is a graph of a second control characteristic of a fan, showing the relationship between the battery voltage level and the target air temperature (TAO) according to the embodiment.

The first and second control characteristics shown in FIGS. 8 and 9 are stored previously in the ROM of the ECU 50. FIGS. 8 and 9 show the relationship between the TAO and the battery voltage level applied to the driving motor 42 of the first and second fans 6, 7. The battery voltage level applied to the driving motor 42 is proportional to a rotation speed of the driving motor 42. Therefore, the battery voltage level applied to the driving motor 42 is proportional to rotation speed levels of the first and second fans 6, 7, and is proportional to the air volume blown by the first and second fans 6, 7. In FIGS. 8 and 9, the battery voltage level of "31" indicates the maximum battery voltage level of a battery mounted on the vehicle. Therefore, at the battery voltage level of "31", each rotation speed of the first and second fans 6, 7 becomes maximum. The first and second control characteristics in FIGS. 8 and 9 show the battery voltage level applied to the driving motor 42 in each TAO (°C.).

When the first control characteristic shown in FIG. 8 is compared with the second control characteristic shown in FIG. 9, the maximum level of voltage applied to the driving motor 42 is reduced by a predetermined value from the level of "29" to the level of "24", at a high temperature side of the TAO. That is, during the double layer flow mode having a high TAO, the battery voltage level applied to the driving motor 42 is automatically reduced from the level of "29" to the level of "24" as compared with the entire outside air mode or the entire inside air mode.

When the air volume is not automatically set at step S300, the air volume is manually controlled at step S310. That is, the air volume is manually set by the air volume setting unit 52e. After the air volume blown from the first and second fans 6, 7 are set, the ECU 50 outputs control signals at step S160 in FIG. 4 to the electric motor 42 and the servomotors 53–55.

Next, the operation of the air conditioning apparatus will be now described with reference to FIGS. 1 and 2. FIGS. 1 and 2 show the blower unit 1 and the air conditioning unit 100, respectively, during the double layer flow mode when the maximum heating state is set in the foot mode. In this state, the inside air introduction port 2 communicates with the suction port 6a of the first fan 6, and the outside air introduction port 3 communicates with the suction port 7a of the second fan 7. Therefore, the first fan 6 blows inside air from the inside air introduction port 2 into the first air passage 8, and the second fan 7 blows outside air from the outside air introduction port 3 into the second air passage 9. In the air conditioning unit 100, both the first and second air-mixing doors 17, 18 are rotated to the solid line positions in FIG. 2. Therefore, the first air-mixing door 17 fully closes the inlet hole 16a of the cool air bypass passage 16, and the top end of the second air-mixing door 18 is approximately arranged on the extending line A of the partition plate 15 at an immediately downstream position of the evaporator 12. That is, the second air-mixing door 18 is used as the movable partition member for partitioning the air passage between the evaporator 12 and the heater core 13 into the first air passage 8 and the second air passage 9.

The warm air bypass door 22 is rotated to the solid line position in FIG. 2 to open the warm air bypass inlet 21, so that a downstream air passage of the heater core 13 is also partitioned into both passages corresponding to the first and second air passages 8, 9. In this case, the defroster door 26 opens the defroster opening portion 25 with a predetermined opening degree, the foot door 310 opens the inlet portion 29a of the front foot opening portion 29 with a predetermined opening degree, and the face door 31 closes the face opening portion 28. Thus, inside air from the inside air introduction port 2 and outside air from the outside air introduction port 3 respectively flows through the first air passage 8 and the second air passage 9 while being partitioned by the partition members 10, 15, 18, 22. All inside air and outside air pass through the heater core 13 so that the passenger compartment is heated in maximum.

Inside air heated in the heater core 13 passes through the warm air bypass inlet 21, and flows into the front and rear foot opening portions 29, 33 through the second warm air passage 30. On the other hand, outside air heated in the heater core 13 flows into the air-mixing chamber 20 through the first warm air passage 19a at an upper side of the warm air bypass door 22. Outside air in the air-mixing chamber 20 branches into two flows, one of which flows into the defroster opening portion 25 and the other of which flows into the front foot opening portion 29 through the communication path 36.

Because outside air having a low humidity is heated and is blown toward the inner surface of the windshield through the defroster opening portion 25, the defrosting performance of te windshield can be improved. On the other hand, because inside air having a high temperature mainly flows into the front and rear foot opening portion 29, 33, the heating effect of the passenger compartment can be improved. In FIG. 2, arrow "C" indicates the flow of inside air, and arrow "D" indicates the flow of outside air.

During the double layer flow mode, since the defroster opening portion 25 is opened by the defroster door 26 with a small opening degree, a part of outside air in the second air passage 9 can flow toward the front foot opening portion 29. Therefore, a ratio between a volume of air flowing into the foot opening portions 29, 33 and a volume of air flowing into the defroster opening portion 25 can be set approximately at $80/20$.

During the foot mode, when a temperature control area for controlling the temperature of blown-air is set from the maximum heating state, a general mode is set in the air conditioning unit 100 from the double layer flow mode. During the general mode, both the air-mixing doors 17, 18 are rotated at intermediate rotation positions, and the first air-mixing door 17 opens the cool air bypass passage 16. Therefore, air having passed through the evaporator 12 flows into the air-mixing chamber 20 through the cool air bypass passage 16.

During the general mode, the warm air bypass door 22 is also rotated to the chain line position in FIG. 2 with the rotation operation of the air-mixing doors 17, 18. Therefore, the warm air bypass door 22 closes the warm air bypass inlet 21, and all air having passed through the heater core 13 flows into the air-mixing chamber 20 through the first warm air passage 19 to be mixed with air from the cool air bypass passage 16. That is, air from the cool air bypass passage 16 and air from the first warm air passage 19a are mixed in the air-mixing chamber 20 to have a predetermined temperature. In this case, the air passage at the immediately downstream side of the heater core 13 is not partitioned by the warm air bypass door 22. Most part of air in the air-mixing chamber 20 flows into the front and rear foot opening portions 29, 33, and is blown toward a lower side of the passenger compartment.

The other part of air in the air-mixing chamber 20 flows into the defroster opening portion 25, and is blown toward the inner surface of the windshield.

When the general mode (i.e., temperature control area) is set during the foot mode, the maximum heating capacity is not necessary in the passenger compartment. Therefore, in this case, generally, there is set the entire outside air mode in which both the first and second inside air introduction ports 2, 2a are closed and only the outside air introduction port 3 is opened. However, by a manual operation of a passenger in the passenger compartment, there may be set the entire inside air mode (at step S250 in FIG. 6).

When the foot/defroster mode is set, the volume of air blown from the front and rear foot opening portions 29, 33 is set to be approximately equal to the volume of air blown from the defroster opening portion 25. Therefore, when the double layer flow mode (the maximum heating state) is set during the foot/defroster mode, the opening degree of the defroster opening portion 25 is increased as compared with that in the foot mode. Thus, the volume of air blown from the defroster opening portion 25 is increased, so that the volume of air blown from the front and rear foot opening portions 29, 33 can be made approximately equal to the volume of air blown from the defroster opening portion 25. The other portions in the foot/defroster mode are similar to those in the foot/defroster mode, and the explanation thereof is omitted.

When the double layer flow mode is set during the foot mode or the foot/defroster mode, both the first inside air introduction port 2 and the outside air introduction port 3 are opened in the blower unit 1. Therefore, the flow resistance of air at the suction sides of the first and second fans 6, 7 is reduced as compared with the entire outside air mode. Further, because the warm air bypass door 22 opens the warm air bypass inlet 21, the flow resistance of air at a downstream side of the heater core 13 is reduced as compared with the entire outside air mode. Thus, during the double layer flow mode, when the rotation speeds of the first and second fans 6, 7 have the same level as that during the entire outside air mode, the air volume blown into the passenger compartment is greatly increased as compared with the entire outside air mode. However, according to the embodiment of the present invention, during the double layer flow mode, because the battery voltage level applied to the electric motor 42 of the first and second fans 6, 7 is controlled based on the first control characteristic shown in FIG. 8, the battery voltage level applied to the electric motor 42 of the first and second fans 6, 7 can be automatically reduced from the level of "29" to the level of "24" at the high temperature TAO side. Therefore, during the double layer flow mode, the maximum rotation speeds of the first and second fans 6, 7 are also reduced to corresponded to the battery voltage level of "24", so that the air volume blown into the passenger compartment during the double layer flow mode can be set at the same level as that during the entire outside air mode. Thus, during the double layer flow mode having a low flow resistance, it can prevent the temperature of air blown from the heater core 13 from being lowered due to an increase of the air volume. Accordingly, a stove ratio (i.e., heating capacity/air volume) is not reduced even during the double layer flow mode, and sufficient heating can be obtained in the passenger compartment.

Figure 10:
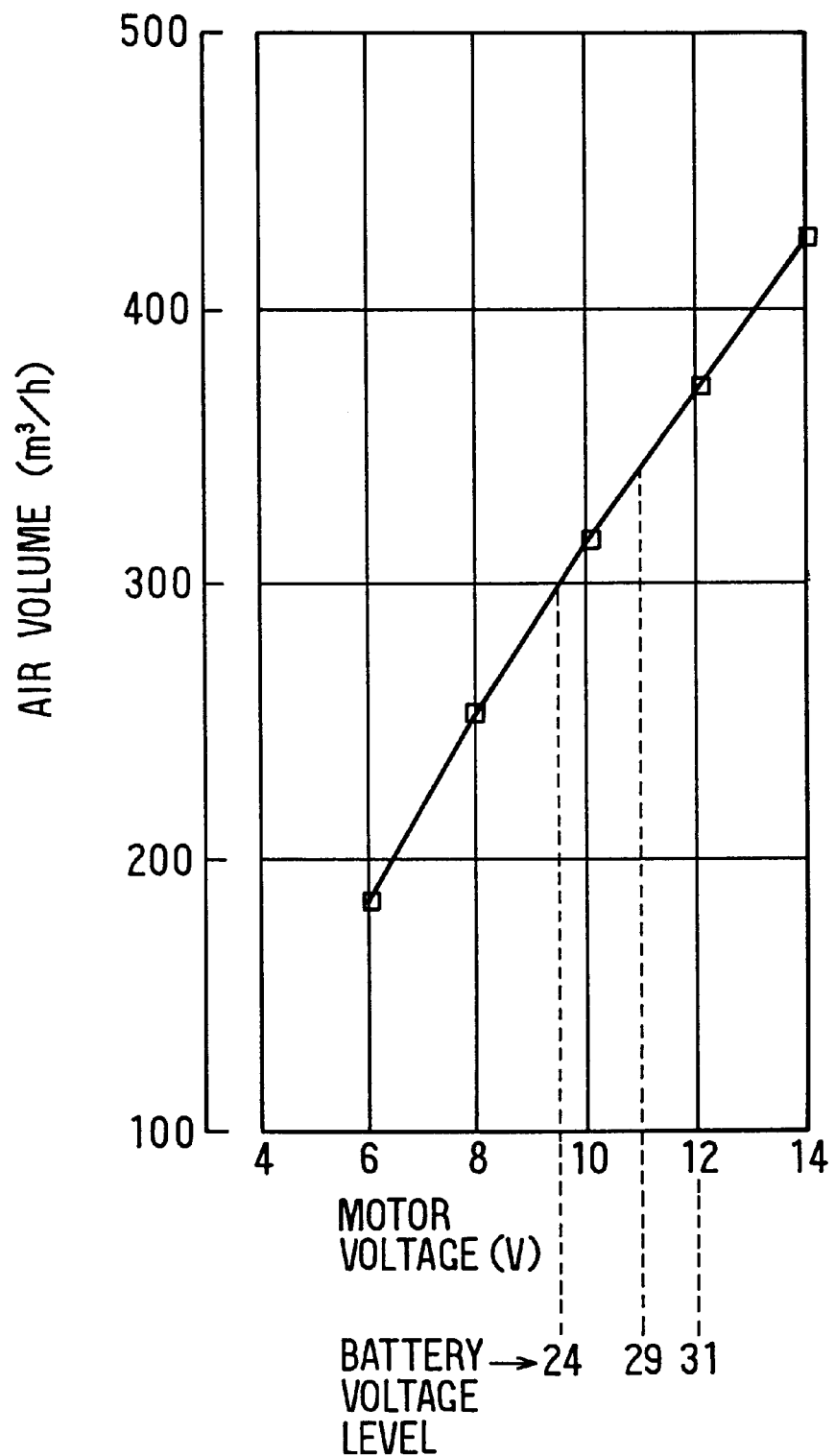
FIG. 10 is a graph showing the relationship between a volume of blown-air, a motor voltage and a battery voltage level, when a double layer flow mode is set during a foot mode, according to the embodiment.
Figure 11:
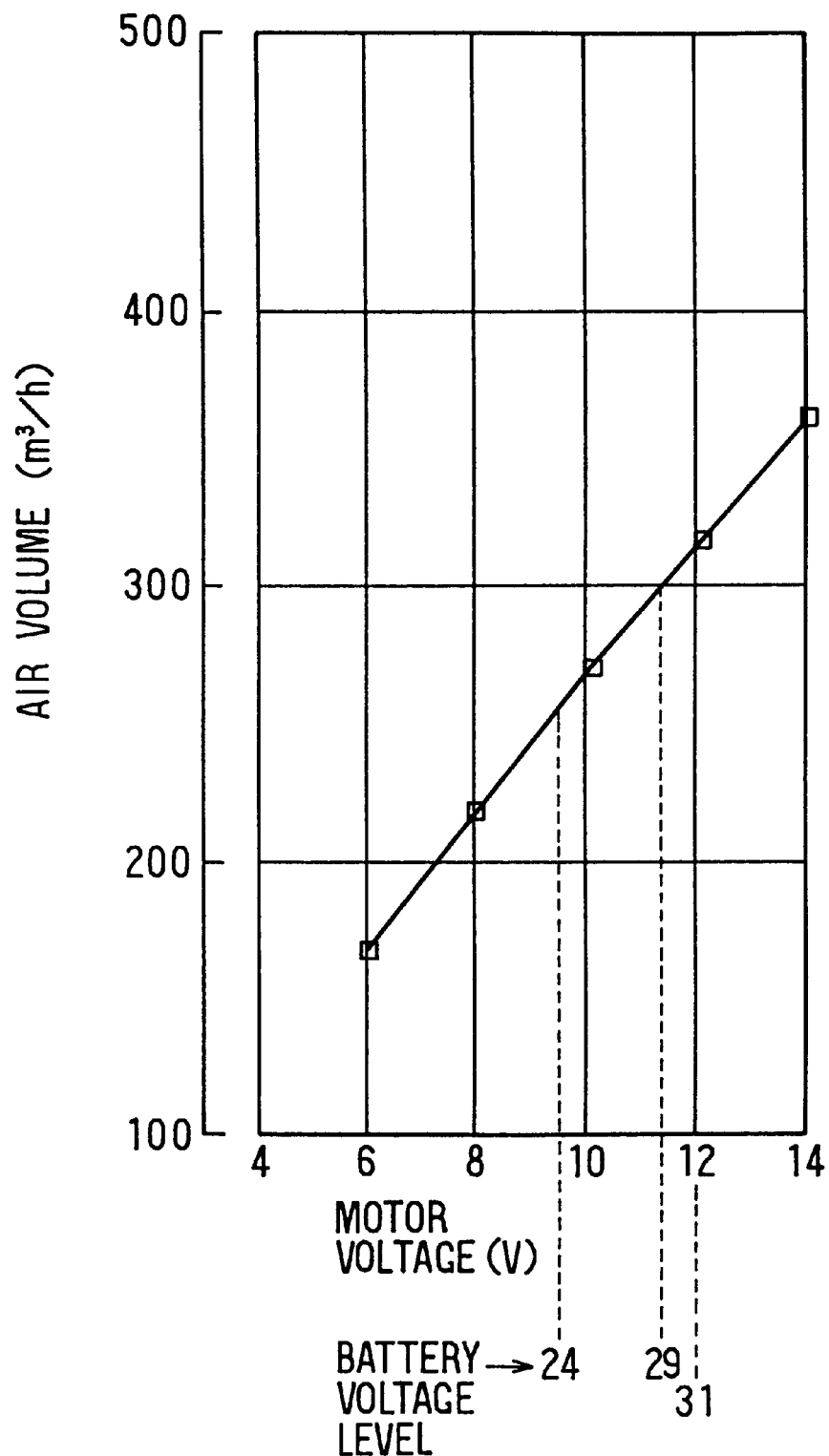
FIG. 11 is a graph showing the relationship between a volume of blown-air, a motor voltage and a battery voltage level, when an entire outside air mode is set during a foot mode, according to the embodiment.

FIGS. 10 and 11 show experimental results by the inventors of the present invention. FIG. 10 shows the relationship between the air volume blown into the passenger compartment, and the voltage and the battery voltage level applied to the driving motor 42 of the first and second fans 6, 7, when the double layer flow mode is set during the foot mode. FIG. 11 shows the relationship between the air volume blown toward the passenger compartment, and the voltage and the battery voltage level applied to the driving motor 42 of the first and second fans 6, 7, when the outside air mode is set during the foot mode. As shown in FIGS. 10 and 11, during the double layer flow mode, when the battery voltage level (voltage) applied to the driving motor 42 is decreased from the level of "29" to the level of "24", the air volume blown into the passenger compartment can be decreased to be equal to that during the entire outside air mode.

Next, the other air outlet mode of the air conditioning apparatus will be simply described. When the face mode is set, the face door 31 opens the face opening portion 28, the warm air bypass door 22 closes the warm air bypass inlet 21, the defroster door 26 closes the defroster opening portion 25, and foot door 310 closes the inlet 29a of the front foot opening portion 29. That is, only the face opening portion 28 is opened by the face door 31. During the face mode, when both the first and second air-mixing doors 17, 18 are rotated to the chain line positions in FIG. 2, the maximum cooling state is set so that all air having passed through the evaporator 12 passes through the cool air bypass passage 16 to be blown toward the face opening portion 28. Both the air-mixing doors 17, 18 are arbitrarily rotated by an angle from the chain line positions in FIG. 2, so that the temperature of air blown from the face opening portion 28 can be arbitrarily adjusted during the face mode. During the face mode, the entire outside air mode is generally set to ventilate the passenger compartment. However, when the maximum cooling state is set during the face mode, the entire inside air mode may be set to reduce the cooling load of the passenger compartment. Further, during the maximum cooling state, both inside air and outside air may be introduced, so that cooling load is reduced while the passenger compartment ventilates.

When the bi-level mode is set, the face opening portion 28 and the front and rear foot opening portions 29, 33 are simultaneously opened, and the defroster opening portion 25 and the warm air bypass inlet 21 are closed. During the bi-level mode, air from the cool air bypass passage 16 mainly flows into the face opening portion 28, and air from the first warm air passage 19a mainly flows into the front and rear foot opening portions 29, 33. Therefore, the temperature of air blown from the face opening portion 28 can be made lower than the temperature of air blown from the foot opening portions 29, 33, and a temperature distribution of blown-air, for "cooling head portion and heating foot portion", can be obtained. During the bi-level mode, the entire outside air mode is generally set to ventilate the passenger compartment.

When a defroster mode is set, the defroster door 26 fully opens the defroster opening portion 25, and face door 31, the foot door 310 and the warm air bypass door 22 are rotated to close the face opening portion 28, the inlet 29a of the foot opening portion 29 and the warm air bypass inlet 21. The temperature of air flowing into the defroster opening portion 25 is adjusted by the rotations of the both air-mixing doors 17, 18. Therefore, air having a predetermined temperature flows into the defroster opening portion 25, and is blown toward the windshield. During the defroster mode, the entire outside air mode is generally set to improve the defrosting performance of the windshield.

Although the present invention has been fully described in connection with the preferred embodiment thereof with reference to the accompanying drawings, it is to be noted that various changes and modifications will become apparent to those skilled in the art.

For example, in the above-described embodiment, the first and second air-mixing doors 17, 18 are used as a temperature control unit to adjust the temperature of air blown into the passenger compartment. However, the present invention may be applied to an air conditioning apparatus in which a hot water valve for adjusting a flow rate or a temperature of hot water flowing into the heater core 13 is used as the temperature control unit.

In the above-described embodiment, during the double layer flow mode, the second air-mixing door 18 and the warm air bypass door 22 are used as the movable partition members so that the first air passage 8 and the second air passage 9 are partitioned from each other. However, the present invention may be applied to an air conditioning unit in which the first air passage 8 and the second air passage 9 are partitioned only using stationary partition members which are fixed to the air conditioning case 11.

In the above-described embodiment, when the double layer flow mode is set during the maximum heating state, the first and second air-mixing doors 17, 18 are rotated to fully close the cool air bypass passage 16. However, during the double layer flow mode, the first and second air-mixing doors 17, 18 may be rotated to a position where the cool air bypass passage 16 is slightly opened.

In the above-described embodiment, the air-mixing doors 17, 18 and the warm air bypass door 22 are operatively linked and are driven by the single common servomotor 54. However, the air-mixing doors 17, 18 and the warm air bypass door 22 may be respectively independently driven by using respective servomotors.

In the above-described embodiment, the evaporator (i.e., cooling heat exchanger) 12 are disposed in the air conditioning unit 100. However, the present invention may be applied to an air conditioning apparatus where the evaporator 12 is not provided. Further, the present invention may be applied to an air conditioning apparatus where the rear foot opening portion 33 is not provided.

Such changes and modifications are to be understood as being within the scope of the present invention as defined by the appended claims.

What is claimed is:

1. An air conditioning apparatus for a vehicle having a passenger compartment, said air conditioning apparatus comprising:

an air conditioning case for forming an air passage, said air conditioning case having a first opening portion for blowing air toward a lower portion of the passenger compartment, a second opening portion for blowing air toward an inner surface of a windshield, a first inside air intake port through which inside air is introduced and an outside air intake port through which outside air is introduced;

a heating heat exchanger for heating air passing through said air passage;

a partition unit for partitioning said air passage into a first air passage through which inside air flows and a second air passage through which outside air flows when a double layer flow mode is set during an air outlet mode where both said first opening portion and said second opening portion are opened, in such a manner that said first air passage communicates with said first opening portion and said second air passage communicates with said second opening portion;

a first fan for blowing inside air introduced from said inside air intake port into said first air passage during said double layer flow mode;

a second fan for blowing outside air introduced from said outside air intake port into said second air passage during said double layer flow mode;

a motor for driving said first and second fans;

a temperature control unit for adjusting a heating amount by said heating heat exchanger to control a temperature of air blown into the passenger compartment;

an inside/outside air setting unit for manually setting an outside air introduction state for introducing outside air to said blower;

double layer flow mode setting means for automatically setting said double layer flow mode when said outside air introduction state is set manually by said inside/outside air setting unit, while both said first opening portion and said second opening portion are opened and the heating amount is maximized by said temperature control unit; and rotation speed reducing means for automatically reducing each rotation speed of said first and second fans to a predetermined level to reduce an air volume blown by said first and second fans, during said double layer flow mode, wherein:

said rotation speed reducing means sets each maximum rotation speed of said first fan and said second fan during an entire inside air mode to be equal to that during an entire outside air mode, and sets each maximum rotation speed of said first fan and said second fan during said double layer flow mode to be smaller than any one of that during the entire inside air mode and that during the entire outside air mode.

2. The air conditioning apparatus according to claim 1, further comprising a filter for filtering air, wherein:

said air conditioning case has a second inside air intake port through which inside air is introduced; and said filter is disposed between said second fan, and both said outside air intake port and said second inside air intake port, so that:

inside air from said second inside air intake port is introduced into both said first fan and said second fan after passing through said filter, during said entire inside air mode, outside air from said outside air intake port is introduced into both said first fan and said second fan after passing through said filter, during said entire outside air mode, and inside air from said first inside air intake port is introduced into said first fan while bypassing said filter, and outside air from said outside air intake port is introduced into said second fan after passing through said filter, during said double layer flow mode.

3. An air conditioning apparatus for a vehicle having a passenger compartment and an engine, said air conditioning apparatus comprising:

an air conditioning case for forming an air passage, said air conditioning case having a first opening portion for blowing air toward a lower portion of the passenger compartment, a second opening portion for blowing air toward an inner surface of a windshield, an inside air intake port through which inside air is introduced and an outside air intake port through which outside air is introduced;

a blower for blowing air into said air passage, said blower including first and second fans for blowing air, and a motor for driving said first and second fans;

a heating heat exchanger for heating air passing through said air passage using hot water flowing from said engine;

a temperature control unit for adjusting a heating amount by said heating heat exchanger to control a temperature of the air blown into the passenger compartment;

a partition unit for partitioning said air passage into a first air passage through which inside air flows and a second air passage through which outside air flows when a double layer flow mode is set during an air outlet mode where both said first opening portion and said second opening portion are opened, in such a manner that said first air passage communicates with said first opening portion and said second air passage communicates with said second opening portion;

a rotation speed reducing unit for automatically reducing the maximum rotation speed of said blower to a predetermined level to reduce an air volume blown by said blower during said double layer flow mode, wherein said inside air intake port is provided to correspond to said first fan in such a manner that inside air introduced from said inside air intake port is blown by said first fan toward said first opening portion through said first air passage, and said outside air intake port is provided to correspond to said second fan in such a manner that outside air introduced from said outside air intake port is blown by said second fan toward said second opening portion through said second air passage, during said double layer flow mode; and a filter for filtering air wherein:

said rotation speed reducing unit sets each maximum rotation speed of said first fan and said second fan during an entire inside air mode to be equal to that during an entire outside air mode, and sets each maximum rotation speed of said first fan and said second fan during said double layer flow mode to be smaller than any one of that during the entire inside air mode and that during the entire outside air mode;

said air conditioning case has an auxiliary inside air intake port through which air is introduced; and said filter is disposed between said fan, and both said outside air intake port and said auxiliary inside air intake port, so that:

inside air from said auxiliary inside air intake port is introduced into both said first fan and said second fan after passing through said filter, during said entire inside air mode, outside air from said outside air intake port is introduced into both said first fan and said second fan after passing through said filter, during said entire outside air mode, and inside air from said first inside air intake port is introduced into said first fan while bypassing said filter, and outside air from said outside air intake port is introduced into said second fan after passing through said filter, during said double layer flow mode.

* * * * *